United States Patent [19]

Obayashi et al.

[11] 4,298,645
[45] Nov. 3, 1981

[54] TARPAULINS HAVING GREAT TEARING STRENGTH

[75] Inventors: Tsutomu Obayashi, Kanamachi; Hideyuki Hiraoka, Musashino, both of Japan

[73] Assignee: Hiraoka & Co., Ltd., Tokyo, Japan

[21] Appl. No.: 168,057

[22] Filed: Jul. 14, 1980

Related U.S. Application Data

[63] Continuation of Ser. No. 21,921, Mar. 19, 1979, abandoned.

[30] Foreign Application Priority Data

Apr. 18, 1978 [JP] Japan .................................. 53-41384
Apr. 20, 1978 [JP] Japan .................................. 53-45960
Nov. 16, 1978 [JP] Japan .................................. 53-141454

[51] Int. Cl.$^3$ .............................................. B32B 5/12
[52] U.S. Cl. .................................... 428/110; 428/107; 428/253; 428/257
[58] Field of Search ............... 428/105, 107, 108, 109, 428/110, 112, 284, 289, 257, 258, 259, 253

[56] References Cited

U.S. PATENT DOCUMENTS

4,025,684  5/1977  Neidhardt ........................... 428/258
4,183,993  1/1980  Benstead et al. .................... 428/253

*Primary Examiner*—James J. Bell
*Attorney, Agent, or Firm*—Carroll F. Palmer

[57] ABSTRACT

Tarpaulins having great tearing strength, which are produced by weaving base fabrics from the mixture of a principal thread and another thread being superior to the principal thread in either of breaking elongation, breaking strength and breaking work or being different from the principal thread in adhesive strength with respect to film, or from the mixture of the principal thread to be used for warp and woof and the another binding yarn being superior to the principal thread in either of breaking elongation, breaking strength and breaking work or being different from the principal thread in adhesive strength, and by forming films consisting of plastics, rubbers or mixtures thereof on the base fabrics by application or adhesion.

7 Claims, 1 Drawing Figure

TARPAULINS HAVING GREAT TEARING STRENGTH

This is a continuation of application Ser. No. 021,921, filed Mar. 19, 1979 now abandoned.

BACKGROUND OF THE INVENTION

Detailed Description of the Invention

This invention relates to tarpaulins having greatly increased tearing strengths.

For sheets to cover goods placed outdoors, freight cars or vehicles, use has been made of canvas consisting of spun yarns such as cotton, hemp and poly(vinyl acetal) series fibers, one side or both sides of which are treated with paraffin or synthetic resins to provide a waterproof property. However, the canvas has such defects as heavy weight per unit area, comparatively great absorption of water, comparatively small strength per unit weight, poor durability and high cost of base fabrics resulting from the high cost of yarns which require a spinning process.

Recently, however, there has been demand for canvas of great strength, light weight and low cost, so that a filament of various synthetic fiber consisting of a single thread of a great strength has come into use. A filament of this type, since it consists of a continuous thread, has a high rate of utilization because of its strength, so that the canvas woven therefrom has many merits such as a great tensile strength, a small amount of thread, thereby leading to a decrease in the weight thereof, and the low cost of tarpaulins because of using the inexpensive threads requiring no spinning process. However, there are some defects in such tarpaulins made of base fabrics consisting of the synthetic fiber filaments. When the density of the base fabric is high or when the base fabric is treated with resin to fix the freedom of the fibers, the tensile strength thereof is great but the tearing strength is comparatively small. A tarpaulin used for trucks, for example, which is produced by weaving a base fabric from ordinary polyester filaments and waterproofing the base fabric, is defective in that when a small tear occurs in the tarpaulin, a large L-shaped laceration is caused and enlarges over a short period of time.

In order to overcome the above defects, a thick thread is woven into the base fabric to increase the tear strength thereof. In this case, it is considered that the thick thread may prevent the tearing of the base fabric, but in fact, the thick thread only indicates the presence of many fibers in part and so does little to prevent the strikingly accelerated tearing of the tarpaulin including the thick thread. Moreover, when a waterproof film is formed, the portion of the swollen thick thread causes the top portion of the film to break so as to lose the waterproofing effect. p One object of this invention is to provide tarpaulins, particularly having great tearing strengths, formed by adhering films of plastics, rubbers or mixtures thereof to one side or both sides of base fabrics woven from filaments or spun yarns by application or impregnation. The fundamental principle of this invention resides mainly in using base fabrics for tarpaulins woven from a mixture of a principal thread and another thread which is different from the principal thread in physical properties or in using base fabrics for tarpaulins provided by twisting a binding yarn which is different from the principal thread in physical properties around the principal thread arranged in warp and woof so as to increase the tear strength of a base fabric by mingling the principal thread with the thread different therefrom in physical properties in either case. This invention can be applied not only to woven fabrics of filaments but also to woven fabrics of spun yarns.

SUMMARY OF THE INVENTION

The following is the description as to the modes of mingling the principal thread with the thread different therefrom in physical properties.

(i) A thread having a breaking elongation substantially 5% greater than that of the principal thread of the base fabric is mingled.

(ii) A thread having a breaking strength substantially 10% greater than that of the principal thread of the basic fabric is mingled.

(iii) A thread having a breaking work substantially 10% greater than that of the principal thread of the base fabric is mingled.

(iv) A thread having an adhesive strength with respect to film substantially less than of the principal thread of the base fabric is mingled.

The following is the description as to the modes of mingling threads to form base fabrics.

a. A mode of forming a base fabric by beating into the principal thread at intervals the above-mentioned special thread having the superior breaking elongation, breaking strength or breaking work, or the special thread having the smaller adhesive strength with respect to film than that of the principal thread.

b. A mode of forming a base fabric by doubling into the principal thread the special thread having the superior breaking elongation, breaking strength or breaking work, or the special thread having the smaller adhesive strength with respect to film than that of the principal thread.

c. A mode of forming a base fabric by using a twined thread made by twining the principal thread and the special thread having the superior breaking elongation, breaking strength or breaking work, or the special thread having the smaller adhesive strength to film.

d. A mode of forming a base fabric by twisting the special thread having the superior breaking elongation, breaking strength or breaking work, or the special thread having the smaller adhesive strength to film than that of the principal thread around the warp and woof of the principal thread.

BRIEF DESCRIPTION OF THE DRAWING

The FIGURE is a fragmentary plan view of the structure of base fabric used to form tarpaulins in accordance with the invention.

DESCRIPTION OF PREFERRED EMBODIMENTS

Figure 1:
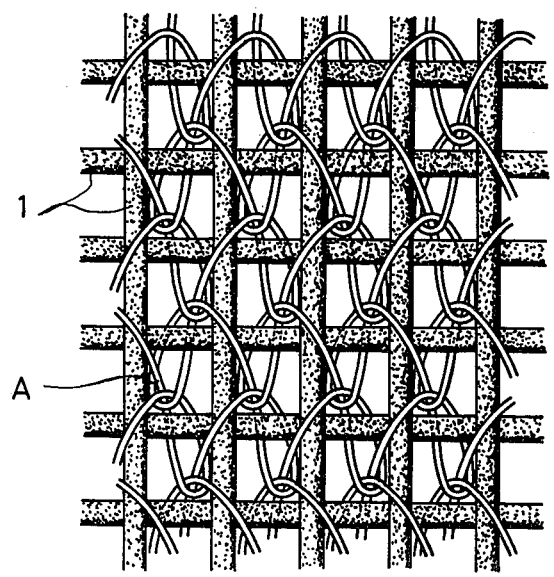

The following is a detailed description as to the threads which are different from the principal thread in physical properties and the modes of mingling the same in the above order.

(i) First, there is given the explanation as to the case of mingling the principal thread with the thread (referred to as thread A) which is different from the principal thread in physical properties or having a breaking elongation of 5% greater than that of the principal thread. The thread A is used to prevent tearing by absorbing the transmission of tearing power at the portion of the thread A having a breaking elongation substantially 5% greater than that of the principal thread.

Among the various modes of mingling threads mentioned in the above Items a, b, c and d, the most favorable one is that of beating the thread A into the warp or woof of the filament fabric at intervals or using the thread as a binding yarn around the principal thread. In the most desirable polyester filament fabrics, the breaking elongation of the principal thread filament is 15% or less, particularly 8-12%, while that of the filament of different physical properties (which is referred to as filament A) having a breaking elongation 5% greater than that of the principal thread is 15% or more, particularly 20% or more, so that there is a difference of at least 5% or more between them. The filament A can be obtained by controlling the polymerization degree of raw materials when produced to keep the tensile strength above the ordinary level and to have a great breaking elongation, or by strictly restraining the drawing of the filament, for example, a thread of low drawing rate or carrying out the crimping thereof in the secondary processing or twisting another filament around a central filament to increase the apparent breaking elongation. As raw materials for filaments, polyesters can favorably be used, but any other synthetic fibers having the properties similar to the above may be employed. The principal filament and the filament A are woven at intervals, in the doubled state or after being twined into one thread. Threads can be used in the state of being twisted or not-twisted and further can be used as binding yarns around the principal threads. In case of fabrics, the voids thereof are properly 20% or less. The base fabrics woven by the doubling of filaments have even surfaces which are suitable for forming films such as synthetic resins thereon because of including few air-cells and having a good adhesive property, so that smooth and well-finished surfaces of products can be obtained.

This mode can be applied not only to filament fabrics but also to spun yarn fabrics to obtain the same effects.

On the base fabrics thus obtained are made films of rubbers, synthetic rubbers such as Neoprene and Hypalon or natural rubber, synthetic resins such as vinyl chloride, EVA, acrylic resin, urethane resin, silicone resin, chlorinated polyethylene and the like or mixtures thereof by application, impregnation or adhesion to provide tarpaulins. It is difficult to prevent films from being mixed with pigments, fillers, additives and the like. The application, impregnation or adhesion of films are carried out by the well-known process of coating, topping, dipping or laminating.

(ii) Secondly, there is the mode of using the thread A having a breaking strength of 10% per unit denier, preferably 20-30%, greater than that of the principal thread. The purpose is to check the progressive tearing at the portion of the principal thread by using the portion of the thread having a great strength substantially 10% greater than that of the principal thread. Although there are various modes of mingling threads as mentioned in the Items a, b, c and d, the thread A is usually woven into the warp or woof of fabric at intervals or used as the binding yarn around the principal thread.

In this case, it is desirable that the voids of the base fabric be 20% or less, preferably 10-15% or less, so that the density of the base fabric is comparatively high, although this invention is not limited thereby. In this mode, filament fabrics are also the most desirable.

The principal thread of the base fabric is selected from raw materials such as nylon, polyester, poly(vinyl acetal) fibers, other organic or inorganic fibers, while the filament A having a strength per unit denier 10% greater than that of the principal thread is selected from nylon, polyester, aromatic series nylon, other well-known synthetic fibers, glass fibers, steel fibers and other well-known inorganic fibers.

For example, when polyester filament having a tensile strength per unit denier of 8.5 g is used as the principal thread, an aromatic series nylon filament having a tensile strength per unit denier of 20 g is mingled as the filament A. From the view-point of the processing facility of the base fabric, it is desirable to use the filaments of the same raw material. In this case, for example, a filament of a tensile strength of 8 g per unit denier is used as the principal filament and a filament of a tensile strength of 10 g per unit denier as the filament A. When the filaments consisting of the same materials are used, it is desired that at least the ductilities of both threads be the same if possible.

This mode can be applied to spun yarn fabrics to obtain approximately the same effect.

The mode of forming tarpaulins by carrying out the application, impregnation or adhesion of films onto the base fabrics thus obtained in the same as that given in the above description (i).

(iii) The following is a description of using the thread A having such a toughness that the breaking work thereof is 10%, preferably 20-30% greater than that of the principal thread. It is to be noted that the breaking work in this invention indicates the rough product of tensile strength and tensile ductility at the time the thread is broken, but as strictly estimated, the same can be obtained by a comparison as to the area of the stress-strain curve.

Breaking Work ≈ Breaking Tensile
Strength × Breaking Tensile Elongation

In the usual mode of mingling, the thread A is beaten into the warp or woof of the base fabric at intervals, or used as the binding yarn. As mentioned in the preceding item, it is favorable to use a base fabric of a comparatively high density wherein the voids thereof are 20% or less, preferably 10-15% or less. Filaments are the most suitable for the raw materials of base fabrics. For example, when a polyester filament having a breaking tensile strength of 8.0 g per denier and a breaking tensile elongation of 13% is used as the principal filament, polyamide fiber having a breaking tensile strength of 8 g per denier and a breaking tensile elongation of 20% is used as the filament A. In this case, the breaking work of the filament A is about 54% greater than that of the principal filament. Also, when both filaments consist of the same material, the principal filament is a polyester filament of a breaking tensile strength of 9 g per denier and a breaking tensile elongation of 12% while that of the filament A is 7 g and 18%, respectively. The breaking work of the latter is 17% more than that of the former. This mode can be applied to spun yarn fabrics to obtain approximately the same effect.

The mode of forming tarpaulin by the application, impregnation or adhesion of film on the base fabric thus obtained is the same as given in the description of the above Item (i).

(iv) The following is a description of mingling the thread A having a smaller adhesive strength to film in comparison with the principal thread. The thread A having a smaller adhesive strength indicates one of the type that consists of a different fiber of essentially having a different adhesive property from the principal thread, or which consists of the same fiber as the principal thread but whose surface is treated with silicone or the like to decrease its adhesive property, so that the adhesive strength of the base fabric to film is lowered at the portion of the thread A. In the usual mode of mingling, the thread A is beaten into the warp and woof of the principal thread at intervals or used as the binding yarn around the principal thread. The strength and elongation of the thread A are not particularly limited, but it is clear that the employment of the thread A having the different breaking elongation, breaking strength or breaking work as described in the above-mentioned Items (i), (ii) and (iii) further increases the tearing strength of the base fabrics. The conditions of the raw materials and so on are the same as given in Item (i). In brief, it is quite important that the adhesive strength with respect to film of the thread A be smaller than that of the principal thread. For example, when the polyester filament is used as the principal thread, a polyfluoroethylene filament is used as the thread A. In view of the processing facility of the base fabric, the same threads are desired, so that the polyester filament is used as the principal thread, and the polyester filament previously treated with silicone, oil or the like for decreasing its adhesive property is used as the thread A. The conditions as to the kinds of plastics, rubbers or mixtures thereof to be used for film, and the methods of application thereof are the same as given in the description of Item (i).

Finally, there is given the more detailed explanation as to the base fabric made by twisting the binding yarn of different physical property around the principal thread arranged in warp and woof. In this case, threads placed as warp and threads placed as woof can be woven by each other or these threads arranged in the unwoven state of warp and woof are twisted and combined by the binding yarn to form the base fabric. The binding yarn is formed longer than the warp and woof of the principal thread. The desirable binding yarn is substantially slender and has such a physical property that even when the warp and woof of the principal thread are broken or deformed by the tearing of tarpaulin, the portion where the principal thread and the binding yarn are twisted and combined, at least one part thereof is not broken as a result.

FIG. 1 shows the scheme of the base fabric, wherein 1 indicates the principal threads arranged in warp and woof and A indicates the binding yarn of different physical property.

For example, when a polyester filament having a breaking strength of 8.5 g per unit denier is used as each of the warp and woof of the thread 1, that of 10 g is used as the binding yarn A. In the base fabric thus obtained, the principal thread arranged in warp and woof reinforces the tensile strength of the fabric and the binding yarn resists the impact-like force which is applied when the base fabric tears, or absorbs the tearing energy to prevent the resin film layer and the base fabric layer from peeling off, and as a result greatly increases the tearing strength of the fabric.

As described above, the reason why the tearing strength of the tarpaulin of the present invention is greatly increased by mingling the principal thread with the thread A of different physical properties resides in the reinforcement of the tensile strength of the tarpaulin by the principal thread and the absorption of the impact-applied force on tearing by the thread A to bring about the reciprocal retainment of both tearing strengths in the tarpaulin by combining the merits of both members in case of Items (i)–(iii), and resides in the action and effects of the portions of small adhesive strength prepared in some portions between the base fabric and the film which prevents the enlargement of the tearing of the base fabric by promoting the slip which accompanies the tearing of tarpaulin, thereby to increase the freedom of threads and absorb the tearing energy.

This invention is further illustrated by the following Examples in detail.

EXAMPLE 1

A plain fabric having the following standard was produced by beating one thread of 500 total denier polyester filaments (thread A) of a breaking strength of 9 g/denier and a breaking elongation of 18% at intervals of six threads of 500 total denier polyester filament (principal thread) of a breaking strength 9 g/denier and a breaking elongation of 12% for each warp and woof.

$$\text{Standard:} \left[ \frac{500/1 \times 500/1}{28 \times 28} \text{ (number of thread/inch)} \right]$$

The plain fabric thus obtained was used as the base fabric. A vinyl chloride resin film having an average thickness of 0.3 mm was formed on either side of the base fabric which was previously treated by the application of an adhesive after heat-setting to produce a tarpaulin.

From the thus obtained tarpaulin was taken a 150 mm × 180 mm test piece, on which was made a longitudinal break of 100 mm on the 180 mm side. The strength (kg) needed for stretching the test piece at the central portions of both edges of the 150 mm sides was termed the tearing strength. In this example, the tearing strength based upon measurement was 7.8 Kg.

EXAMPLE 2

A base fabric having the same standard as given in Example 1 was woven from doubled threads consisting of six threads of 500 total denier polyester filament of a breaking strength of 9 g/denier and a breaking elongation of 12% and one thread of 500 total denier polyester filament (filament A) of a breaking strength of 9 g/denier and a breaking elongation of 18%, and the same film as given in Example 1 was formed thereon to obtain a tarpaulin. The tearing strength thereof was 9.8 kg.

EXAMPLE 3

A base fabric was woven from the thread prepared by twining six threads of polyester filament of a breaking strength of 9 g/denier and a breaking elongation of 12% and one thread of polyester filament of a breaking strength of 9 g/denier and a breaking elongation of 18% into a 500 total denier thread and the same film as given in Example 1 was formed thereon to obtain a tarpaulin. The tearing strength thereof was 8.5 g.

EXAMPLE 4

A base fabric was formed by arranging in parallel 10 threads of 500 total denier polyester filament of a breaking strength of 9 g/denier and a breaking elongation of 12% in a space of one inch for each warp and woof and twisting one thread of 500 total denier polyester filament of a breaking strength of 9 g/denier and a breaking elongation of 18% around the threads as shown in FIG. 1. The same film as given in Example 1 was formed on the base fabric to produce a tarpaulin. The tearing strength thereof was 9.8 g.

EXAMPLE 5

A plain base fabric was produced by beating 45 threads prepared by arranging one thread of polyester spun yarn (No. 10 single thread) of a breaking strength (single thread) of 1.3 kg and a breaking elongation of 18% at intervals of five threads of polyester spun yarn (No. 10 single thread) of a breaking strength (single thread) 1.3 kg and a breaking elongation of 13% as the principal thread in a space of one inch for each warp and woof. The same film as given in Example 1 was formed on the base fabric to obtain a tarpaulin. The tearing strength thereof was 5.8 kg.

EXAMPLES 6–8

The same principal thread and the same thread A as given in Example 5 were used. Base fabrics were prepared by using the same uniformly arranged threads as used in Example 2, the same twined thread as used in Example 3 and the same binding yarn as used in Example 4. The same film as given in Example 1 was formed on either side of the above fabrics to produce tarpaulins. The tearing strength of each of the tarpaulins was shown as follows:

| Example 6 | doubled threads | 7.0 kg |
| Example 7 | twined thread | 6.5 kg |
| Example 8 | binding yarn | 6.8 kg |

EXAMPLE 9

A base fabric was produced by beating one thread of 500 denier polyester filament of a breaking strength of 9 g/denier and a breaking elongation of 18% as the thread A at intervals of five threads of polyester spun yarn (No. 10 single thread) of a breaking strength (single thread) of 1.3 kg and a breaking elongation of 13% as the principal thread. The same film as given in Example 1 was formed on the base fabric to obtain a tarpaulin. The tearing strength thereof was 5.8 kg.

EXAMPLES 10–12

The same principal thread and the same thread A as given in Example 9 were used and base fabrics were produced by using the doubled threads, the twined thread and the binding yarn according to Examples 2, 3 and 4. The same film was formed thereon to obtain tarpaulins. The tearing strength of each of the tarpaulins was shown as follows:

| Example 10 | doubled threads | 7.2 kg |
| Example 11 | twined thread | 6.6 kg |
| Example 12 | binding yarn | 7.0 kg |

EXAMPLE 13

A base fabric was produced by beating one thread of 500 total denier polyester filament of a breaking strength of 10 g/denier and a breaking elongation of 12% as the thread A at intervals of six threads of 500 total denier polyester filament of a breaking strength of 8 g/denier and a breaking elongation of 12% of the principal thread for each warp and woof according to the standard given in Example 1. The same film was formed thereon to obtain a tarpaulin. The tearing strength thereof was 7.7 kg.

EXAMPLES 14–16

Tarpaulins were produced by using the same threads as given in Example 13 according to Examples 2, 3 and 4. The tearing strength of each tarpaulin was shown as follows:

| Example 14 | doubled threads | 9.7 kg |
| Example 15 | twined thread | 8.4 kg |
| Example 16 | binding yarn | 8.9 kg |

EXAMPLE 17

A base fabric was produced by beating 45 threads arranged in the ratio of five threads of polyester spun yarn (No. 10 single thread) of a breaking strength (single thread) of 1.3 kg and a breaking elongation of 13% as the principal thread and one thread of polyester spun yarn (No. 10 single thread) of a breaking strength (single thread) of 1.8 kg and a breaking elongation of 13% as the thread A, in a space of one inch for each warp and woof thereof. The same film as given in Example 1 was formed on the base fabric to obtain a tarpaulin. The tearing strength thereof was 5.7 kg.

EXAMPLES 18–20

Tarpaulins were produced by using the same threads as given in Example 17 according to Examples 2, 3 and 4. The tearing strength of each tarpaulin was shown as follows.

| Example 18 | doubled threads | 5.7 kg |
| Example 19 | twined thread | 6.9 kg |
| Example 20 | binding yarn | 6.4 kg |

EXAMPLE 21

For each of warp and woof was used 500 total denier polyester filament of a breaking strength of 8 g/denier and a breaking elongation of 13% as the principal thread and 500 total denier polyester filament of a breaking strength of 10 g/denier, a breaking elongation of 18% and a breaking work of 17% greater than that of the principal thread as the thread A. A base fabric of the same standard as in Example 1 was produced by beating one thread of the latter at intervals of six threads of the former and a vinyl chloride film having a thickness of 0.3 mm was formed on either side of the base fabric to obtain a tarpaulin. The tearing strength thereof was 7.8 kg.

EXAMPLES 22–24

The same principal thread and the same thread A as given in Example 21 were used. According to Examples 2, 3 and 4, base fabrics were produced by using the doubled threads, the twined thread and the binding yarn, respectively, and a film was formed on either side of the base fabrics under the same conditions to obtain tarpaulins. The tearing strength of each tarpaulin was shown as follows:

| Example 22 | doubled threads | 9.6 kg |
|---|---|---|
| Example 23 | twined thread | 3.2 kg |
| Example 24 | binding yarn | 9.2 kg |

EXAMPLE 25

For each warp and woof was used No. 10 single thread of poly(vinyl acetal) spun yarn (trade mark Vinylon) of a breaking strength (single thread) of 1.3 kg and a breaking elongation of 10% as the principal thread and 325 total denier polyester filament of a breaking strength of 8 g/denier and a breaking elongation of 12% as the thread A (the latter had a breaking work 1.7 times as much as that of the former). A tarpaulin was produced according to the standard given in Example 1 and the tearing strength thereof was 4.8 kg.

EXAMPLES 26–28

Tarpaulins were produced by using the same threads as given in Example 25 according to Example 2, 3 and 4. The tearing strength of each tarpaulin was shown as follows:

| Example 26 | doubled threads | 6.2 kg |
|---|---|---|
| Example 27 | twined thread | 5.6 kg |
| Example 28 | binding yarn | 6.2 kg |

COMPARATIVE EXAMPLES 1–28

Tarpaulins were produced by preparing base fabrics and forming films thereon under the same conditions as given in Examples 1–28, except that only the principal threads employed in Examples 1–28 were used. The tearing strength of each tarpaulin was as given in the following table. It is to be noted that the numbers in parentheses indicate the tearing strengths of the corresponding Examples.

| Comparative Example No. | 1 | 2 | 3 | 4 | 5 | 6 | 7 |
|---|---|---|---|---|---|---|---|
| Tearing strength Kg | 4.2 (7.8) | 4.8 (9.8) | 4.4 (8.5) | 5.0 (9.0) | 3.5 (5.8) | 3.3 (7.0) | 3.3 (6.5) |

| Comparative Example No. | 8 | 9 | 10 | 11 | 12 | 13 | 14 |
|---|---|---|---|---|---|---|---|
| Tearing strength Kg | 3.9 (6.8) | 3.2 (5.8) | 3.9 (7.2) | 3.6 (6.6) | 4.2 (7.0) | 3.2 (7.8) | 4.3 (9.6) |

| Comparative Example No. | 15 | 16 | 17 | 18 | 19 | 20 | 21 |
|---|---|---|---|---|---|---|---|
| Tearing strength Kg | 3.2 (8.2) | 3.5 (9.2) | 3.2 (4.8) | 3.4 (6.2) | 4.0 (5.6) | 4.3 (6.2) | 4.8 (7.7) |

| Comparative Example No. | 22 | 23 | 24 | 25 | 26 | 27 | 28 |
|---|---|---|---|---|---|---|---|
| Tearing strength Kg | 4.8 (9.7) | 4.7 (8.4) | 4.7 (8.9) | 3.4 (5.7) | 3.3 (5.7) | 3.4 (6.9) | 3.1 (6.4) |

EXAMPLE 29

A base fabric was produced according to the same standard as given in Example 1 by using the same principal thread as used in Example 1, 500 total denier polyester filament of a breaking strength of 9 g/denier and a breaking elongation of 12% and the same filament A, 500 total denier polyester filament treated with a non-adhesive silicone on the surface and beating one thread of the latter at intervals of six threads of the former for each warp and woof. The same film as in Example 1 was formed on the base fabric to obtain a tarpaulin. The tearing strength thereof was 8.6 kg.

EXAMPLES 30–32

Tarpaulins were produced by using the same threads as in Example 29 according to Examples 2, 3 and 4. The tearing strength thereof was as follows:

| Example 30 | doubled threads | 10.2 kg |
|---|---|---|
| Example 31 | twined thread | 9.2 kg |
| Example 32 | binding yarn | 10.4 kg |

EXAMPLE 33

A base fabric of the same standard as in Example 1 was prepared by beating one thread of 500 total denier polyester filament made by blending 5% by weight of low molecular weight polyethylene (a breaking strength of 6.5 kg/denier, a breaking elongation of 12%) into six threads of 500 total denier polyester filament (a breaking strength of 9 g/denier, a breaking elongation of 12%) for each warp and woof. The same film as in Example 1 was formed thereon to produce a tarpaulin. The tearing strength thereof was 8.2 kg.

EXAMPLE 34

A plain fabric was prepared by beating 45 threads arranged in the ratio of 5 threads of No. 10 single thread polyester spun yarn (a breaking single thread strength of 1.3 kg, a breaking elongation of 10%) and one thread of the same spun yarn treated with a non-adhesive silicone on the surface in a space of one inch for each warp and woof. The same film as in Example 1 was formed thereon to obtain a tarpaulin. The tearing strength thereof was 6.4 kg.

EXAMPLE 35

A base fabric having the same standard as given in Example 1 was produced by using 500 total denier polyester filament of a breaking strength of 9 g/denier and a breaking elongation of 12% and the same 500 total denier polyester filament treated with a non-adhesive oil agent mainly consisting of mineral oil on the surface and beating one thread of the latter at intervals of six threads of the former. The same film as in Example 1 was formed thereon to obtain a tarpaulin. The tearing strength thereof was 9.8 kg.

EXAMPLES 36–38

Tarpaulins were produced by using the same threads as in Example 35 according to Examples 2, 3 and 4. The tearing strength of each tarpaulin was shown as follows:

| Example 36 | doubled threads | 11.2 kg |
|---|---|---|

-continued

| Example 37 | twined thread | 10.4 kg |
| Example 38 | binding yarn | 10.8 kg |

EXAMPLE 39

A base fabric having the same standard as in Example 1 was produced by beating one thread of 200 total denier polyethylene tetrafluoride filament (a breaking strength of 6 g/denier, a breaking elongation of 10%) into 6 threads of 500 total denier polyester filament (a breaking strength of 9 g/denier, a breaking elongation of 12%) for each warp and woof and the same film was formed thereon to obtain a tarpaulin. The tearing strength thereof was 9.0 kg.

EXAMPLES 40–42

Tarpaulins were produced by using the same threads as in Example 39 according to Examples 2, 3 and 4. The tearing strength of each tarpaulin was shown as follows:

| Example 40 | doubled threads | 10.4 kg |
| Example 41 | twined thread | 9.6 kg |
| Example 42 | binding yarn | 10.8 kg |

EXAMPLE 43

A base fabric having the same standard as in Example 1 was produced by beating one thread of 500 total denier polyester filament of a breaking strength of 10 g/denier and a breaking elongation of 18% as the thread A at intervals of six threads of 500 total denier polyester filament of a breaking strength of 8 g/denier and a breaking elongation of 12% for each warp and woof and the same film was formed thereon to obtain a tarpaulin. The tearing strength thereof was 9.2 kg. In this example, the breaking strength, breaking elongation and breaking work of the thread A were greater than those of the principal thread.

EXAMPLES 44–46

Tarpaulins were prepared by using the same threads as in Example 43 according to Examples 2, 3 and 4. The tearing strength of each tarpaulin was shown as follows:

| Example 44 | doubled threads | 9.5 kg |
| Example 45 | twined thread | 9.0 kg |
| Example 46 | binding yarn | 9.8 kg |

EXAMPLE 47

A base fabric having the same standard as in Example 1 was produced by beating one thread of 500 total denier polyester filament of a breaking strength of 10 g/denier and a breaking elongation of 18% treated with a non-adhesive silicone on the surface as the thread A at intervals of six threads of the same 500 total denier polyester filament of a breaking strength of 9 g/denier and a breaking elongation of 12% as used in Example 1 as the principal thread for each of warp and woof and the same film was formed thereon to obtain a tarpaulin. The tearing strength thereof was 10.5 kg.

EXAMPLE 48

A base fabric was produced by beating one thread of 300 total denier polyethylene tetrafluoride filament of a breaking strength of 7 g/denier and a breaking elongation of 10% as the thread A at intervals of six threads of the same filament as given in Example 47 as the principal thread and the same film as in Example 1 was formed thereon to obtain a tarpaulin. The tearing strength thereof was 9.3 kg.

EXAMPLE 49

The same base fabric as given in Example 1 was used and a waterproof film was formed by applying chlorosulfonated polyethylene (Hypalon) to an average thickness of 0.3 mm on either side of the base fabric instead of a vinyl chloride resin film to obtain a tarpaulin. The tearing strength thereof was 7.7 kg. There was little difference between this film and the vinyl chloride film.

EXAMPLE 50

The same base fabric as given in Example 1 was used and a waterproof film having an average thickness of 0.3 mm was formed by applying a mixture of 90% by weight of chlorosulfonated polyethylene (Hypalon) and 10% by weight of Neoprene on either side of the base fabric instead of a vinyl chloride resin film to obtain a tarpaulin. The tearing strength thereof was 7.6 kg.

EXAMPLE 51

The same base fabric as in Example 1 was used and a vinyl chloride resin film having an average thickness of 0.4 mm was formed only on one side of the base fabric instead of coating both sides thereof to obtain a tarpaulin. The tearing strength thereof was 7.2 kg.

EXAMPLE 52

A base fabric was produced by beating one thread of 500 denier aromatic nylon filament (trademark Kebler 29) of a breaking strength of 20 g/denier and a breaking elongation of 10% at intervals of six threads of 500 total denier polyester filament of a breaking strength of 8 g/denier and a breaking elongation of 12%, and a waterproof film having an average thickness of 0.3 mm was formed on either side of the base fabric by applying a mixture of 90% by weight of vinyl chloride and 10% by weight EVA to obtain a tarpaulin. The tearing strength thereof was 12.3 kg.

EXAMPLE 53

The same base fabric as in Example 1 was used and a waterproof film was formed on either side of the base fabric by applying an urethane resin film having an average thickness of 0.3 mm, instead of a vinyl chloride resin film to obtain a tarpaulin. The tearing strength thereof was 7.0 kg.

I claim:

1. A tarpaulin having a great tear strength, comprising (A) a base fabric composed of (a) a warp layer consisting of a number of warp threads arranged parallel to each other; (b) a weft layer which consists of a number of weft threads arranged parallel to each other, said weft layer being superimposed on said warp layer in such a manner that the longitudinal direction of said weft threads crosses the longitudinal direction of said warp threads, and; (c) a number of auxiliary threads which are entangled around said warp threads and said weft threads and which combine said warp threads with said weft threads at the crossing points thereof, and; (B) at least one waterproofing layer formed on at least one surface of said base fabric, the breaking strength, the breaking elongation and/or the breaking work of said auxiliary threads being higher than that of said warp and weft threads, and/or the adhesive strength of said auxiliary threads to said waterproofing layer being lower than that of said warp and weft threads.

2. The tarpaulin of claim 1 wherein said warp threads and said weft threads are substantially identical.

3. The tarpaulin of claim 2 wherein said auxiliary threads have a breaking elongation at least 10% greater than said warp and weft threads.

4. The tarpaulin of claim 2 wherein said auxiliary threads have a breaking strength at least 10% greater than said warp and weft threads.

5. The tarpaulin of claim 2 wherein said auxiliary threads have a breaking work at least 10% greater than said warp and weft threads.

6. The tarpaulin of claim 1 wherein said waterproofing layer comprises a film of resin selected from the group consisting of vinyl chloride resin, chlorosulfonated polyethylene and urethane resin.

7. The tarpaulin of claim 6 wherein there is a film of said resin on both surfaces of said base fabric.

* * * * *